United States Patent [19]

Hostetler

[11] Patent Number: 4,793,291

[45] Date of Patent: * Dec. 27, 1988

[54] MINI DRINKER

[75] Inventor: Eldon Hostetler, Middlebury, Ind.

[73] Assignee: Ziggity Systems, Inc., Middlebury, Ind.

[*] Notice: The portion of the term of this patent subsequent to Sep. 13, 2005 has been disclaimed.

[21] Appl. No.: 84,419

[22] Filed: Aug. 10, 1987

Related U.S. Application Data

[63] Continuation-in-part of Ser. No. 821,072, Jan. 21, 1986, Pat. No. 4,770,126.

[51] Int. Cl.⁴ .................. A01K 39/022; A01K 7/02
[52] U.S. Cl. ................................. 119/81; 119/72.5
[58] Field of Search .................. 119/72, 72.5, 74, 75, 119/81

[56] References Cited

U.S. PATENT DOCUMENTS

| | | | |
|---|---|---|---|
| 2,472,387 | 6/1949 | Shepherd | 119/81 |
| 2,501,727 | 3/1950 | Kubista | 119/68 |
| 2,700,370 | 1/1955 | Goff | 119/74 |
| 2,796,848 | 6/1957 | Zimmerman | 119/53 |
| 2,821,167 | 1/1958 | Gilbertson | 119/81 |
| 3,306,262 | 2/1967 | Hart | 119/72 |
| 3,590,782 | 7/1971 | Kantor | 119/81 |
| 3,675,627 | 7/1972 | Myers | 119/72 |
| 3,683,956 | 8/1972 | Burrows | 137/408 |
| 3,685,495 | 8/1972 | Kantor | 119/81 |
| 3,804,068 | 4/1974 | Steudler, Jr. | 119/81 |
| 4,164,201 | 8/1979 | Vanderhye | 119/81 |
| 4,192,257 | 3/1980 | Urzi | 119/81 |
| 4,196,699 | 4/1980 | Leeming | 119/81 |
| 4,221,188 | 9/1980 | Hostetler | 119/72 |
| 4,323,036 | 4/1982 | Salerno | 119/81 |
| 4,441,459 | 4/1984 | Giordano | 119/72 |
| 4,491,088 | 1/1985 | Hostetler | 119/72.5 |
| 4,516,533 | 5/1985 | Mallison | 119/72 |
| 4,527,513 | 7/1985 | Hart, et al. | 119/51.5 |
| 4,637,345 | 1/1987 | Hostetler | 119/72.5 |

FOREIGN PATENT DOCUMENTS

| | | |
|---|---|---|
| 0094476 | 2/1983 | European Pat. Off. |
| 3202246 | 8/1983 | Fed. Rep. of Germany |
| 7702326 | 9/1977 | Netherlands |
| 7800392 | 7/1978 | Netherlands |
| 2056246 | 3/1981 | United Kingdom |

Primary Examiner—Robert P. Swiatek
Attorney, Agent, or Firm—Barnes & Thornburg

[57] ABSTRACT

A trough drinker is provided which is detachably secured to the exterior of the supply line separately from and operably associated with a detachable trigger drinker or nipple drinker. The trough drinker includes a vertically extending stem, an elongated housing disposed about the stem and closely separated therefrom, a trough portion extending about the circumference of the housing for retaining water, a base skirt radially extending from the lower portion of the stem, an annular flange extending from the upper portion of the housing, and a spring biasing arrangement to move the flange upward when a predetermined level of fluid is present in the trough. The trigger drinker or nipple drinker is longitudinally offset from the trough drinker along the supply line such that the upward movement of the flange causes the trigger drinker or nipple drinker to be actuated and fluid to flow into the trough over the exterior surface of the housing. The trigger drinker or nipple drinker is separately detachable from the supply line without removing the trough drinker. The trough drinker is snap-fit to the supply line such that rotation and longitudinal movement are prevented. The spring biasing force on the flange is exteriorly adjustable by a lever protrusion. The trough drinker may be readily assembled from or disassembled into its separate components to facilitate cleaning, storage and shipping.

2 Claims, 5 Drawing Sheets

MINI DRINKER

BACKGROUND AND SUMMARY OF THE INVENTION

The present application is a continuation in part of Ser. No. 821,072, filed on Jan. 21, 1986 now U.S. Pat. No. 4,770,126.

The present invention relates generally to watering systems for poultry and/or small animals and, more particularly, to watering systems employing trigger drinkers and/or nipple drinkers.

Previously, poultry houses have employed multiple different poultry watering systems, depending upon the age and size of the birds. For example, for younger and smaller birds floor-mounted pans or platform troughs have been used. As the birds mature, the troughs are elevated or substituted for a trigger drinker or nipple drinker system.

Various trigger drinkers are presently known. One preferred type is described in detail in U.S. Pat. No. 4,491,088, assigned to the same assignee as the present invention. The disclosure of that reference is specifically incorporated herein. In general, trigger drinkers can be mounted directly into the fluid supply line. In a typical system, a plurality of horizontal supply lines are adjustably suspended from the ceiling of a poultry house at heights determined by the size of the birds therein. Each supply line can extend for over 50 meters in length and include a large number of spaced-apart trigger drinkers.

Nipple drinkers generally resemble trigger drinkers in structure and purpose. However, nipple drinkers are typically actuatable by only vertical pin movement and/or significantly restricted horizontal movement. In general, nipple drinkers are less sensitive to pin actuation and, thus, provide a reduced supply of fluid.

Recently, trigger drinkers have achieved widespread acceptance as being suitable for watering poultry of all ages, including day old chicks. However, under some circumstances, one to five day old chicks have not adapted to trigger drinkers easily. This can occur where the chicks are produced from "spent hens" and, as a result, are too weak or unaggressive to crowd in with other chicks at the trigger drinkers. It has been suggested to start these chicks with floor pans or troughs supplied with fluid through a hose from the supply line. Fluid level within such pans or troughs can be maintained at a generally constant level by float valves mounted in the pans or troughs. However, as these chicks get older, if the watering pans are removed and solely trigger drinkers are used, they appear to lack the ordinary intelligence of such birds and will sometimes not adjust to obtaining water at a new location.

At the same time, there are important disadvantages to maintaining a floor supported watering system. Open containers of water lose freshness, become contaminated and are more likely to spill onto the floor area. Further, while the entire trigger drinker system can be simultaneously raised for cleaning the floor area, each floor-supported trough must be separately removed.

It has been suggested to suspend troughs or open cups of water directly from the supply line. While these are generally simpler to install and maintain than floor supported watering devices, some disadvantages have persisted. Often such drinkers have internally housed valve arrangements between the supply line and the trough or cup itself. In some circumstances, these valves can become clogged with debris or mineral deposits. Some specific trigger drinker arrangements have been devised to minimize this clogging, such as the self-cleaning valve shown in U.S. Pat. No. 4,491,088. However, many cup or suspended trough drinkers include internal chambers in which such debris can collect. Those chambers can also permit bacteria to breed and accumulate unless the internal valve elements are cleaned regularly.

Unfortunately, it is often difficult to clean such valves since the entire drinker assembly must be removed from the supply line and disassembled. If the entire supply line is not carefully drained, this can cause much unwanted spillage onto the floor area. Further, some drinkers which are relatively easy to initially install cannot as a practical matter be disassembled for cleaning. As a result, they must be replaced entirely.

Freely suspended drinkers also typically require considerable weight to be attached to the drinker to stabilize it against spillage from the normal jostling in the animal enclosure. Such weights in each drinker over an entire floor system would require considerable machinery to raise and lower the system, in addition to extensive structural reinforcing to hold it in place. Heavy weights also exert unwanted stress on the drinker supply line connection.

Another problem with suspended drinkers arises from the actuating mechanisms used to maintain a constant water level. Typically, these are water weight biased to raise the cup to open a valve as water level decreases in the cup. However, such watering systems are typically lowered close to the floor for very young birds. Unfortunately, poultry house floors are rarely level. As a result, as the system is lowered, some troughs will touch the floor while others remained suspended. Those troughs resting on the floor often overflow with fluid and spill onto the floor area because the valve remains biased open.

In general, it is important to optimize the watering system in a given poultry house by reducing the number of different apparatus that must be used through a given poultry lifetime, minimizing assembly maintenance and repair time, and eliminate leaks and spillage onto the floor area. Since trigger drinkers have otherwise been the preferred watering device for poultry and small animals, it would be desirable to obtain a drinker arrangement complementary or compatible with trigger drinkers.

It is therefore an object of the present invention to provide an improved watering device for poultry and small animals.

Another object is the provision of a watering device which is easy to clean, prevents contamination and eliminates valve clogging.

A further object is to provide a demand responsive watering trough that is stabilized against spillage onto the floor area.

Yet another object is the provision of a watering device that trains young poultry to use trigger drinker watering devices.

Still another object is to provide a trough drinker that cooperatively attaches to a preexisting trigger drinker or nipple drinker watering system and is readily removable for cleaning.

Yet still another object is the provision of a trough drinker for young poultry that may be utilized as either a platform or suspended watering system and without separate adjustment.

These and other objects of the present invention are attained in the provision of a trough drinker detachably secured to the exterior of the supply line separately from and operably associated with a detachable trigger drinker or nipple drinker. The trough drinker includes a vertically extending stem, an elongated housing disposed about the stem and closely separated therefrom, a trough portion extending about the circumference of the housing for retaining water, a base skirt radially extending from the lower portion of the housing, and a spring biasing arrangement to move the flange upward when a predetermined level of fluid is present in the trough. The trigger drinker or nipple drinker is longitudinally offset from the trough drinker along the supply line such that the upward movement of the flange causes the trigger drinker or nipple drinker to be actuated and fluid to flow into the trough over the exterior surface of the housing.

The trigger drinker or nipple drinker is separately detachable from the supply line without removing the trough drinker. The trough drinker is snap-fit to the supply line such that rotational and longitudinal movement are prevented. The spring biasing force on the flange is exteriorly adjustable by a lever protrusion. The trough drinker may be readily assembled from or disassembled into its separate components to facilitate cleaning, storage and shipping.

The trough drinker is advantageously used for newly hatched poultry in conjunction with the trigger drinker or nipple drinker. For example, when the chicks are one to five days old, the trough drinker would be snap-fit in place. Adjustment of the spring biasing establishes the optimum level of fluid in the trough as the birds get older. After five days of age, the trough drinker would be removed and cleaned, leaving the trigger drinkers or nipple drinkers as the sole means of watering.

Other objects, advantages and novel features of the present invention will become readily apparent upon consideration of the following detailed description in conjunction with the drawings.

BRIEF DESCRIPTION OF THE DRAWINGS

FIG. 7 shows a partial cross-sectional view corresponding to the view of FIG. 1 according to an alternative embodiment of the present invention.

DESCRIPTION OF THE PREFERRED EMBODIMENTS

Figure 1:
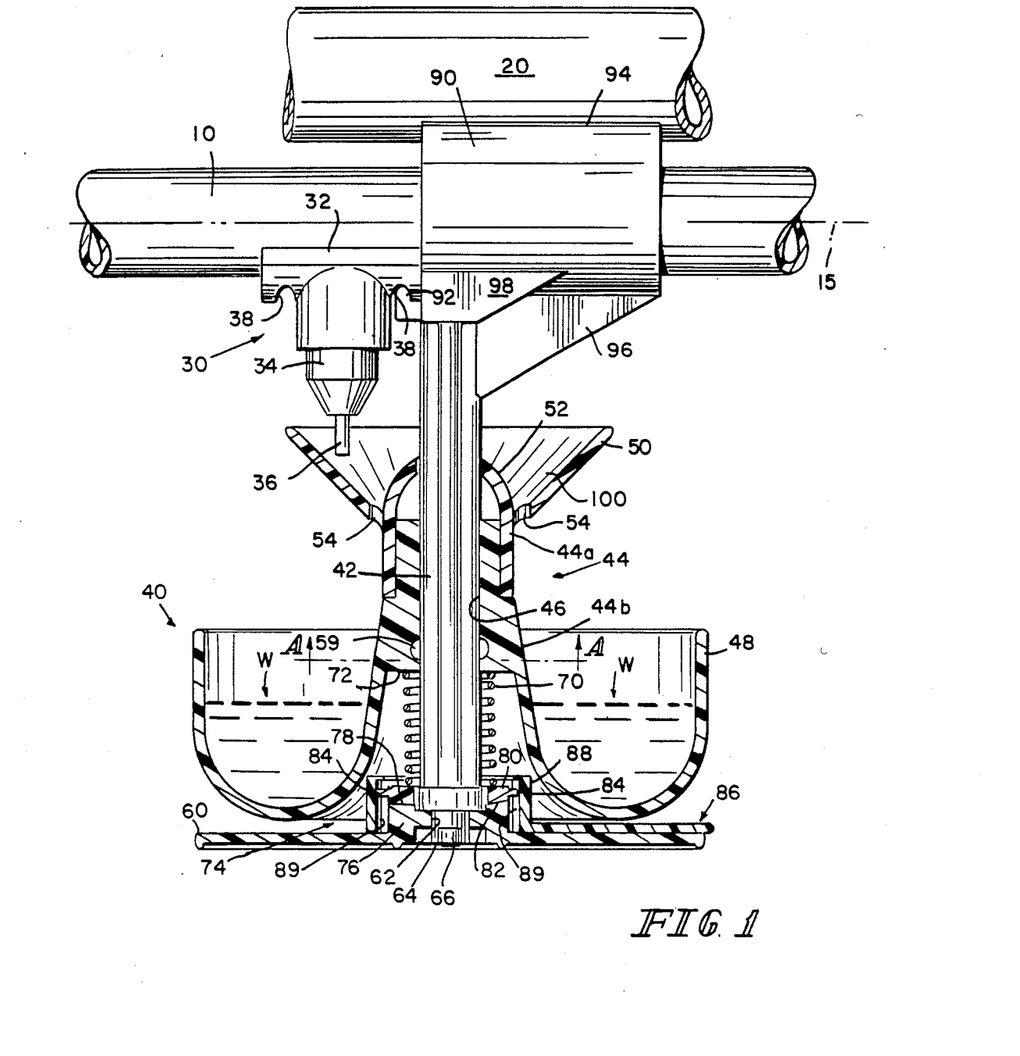
FIG. 1 shows a partial cross-sectional view along the stem axis of a watering arrangement according to the present invention in a nonactuating position with respect to the trigger drinker.

FIG. 1, which illustrates a preferred embodiment of the present invention, shows a watering system having a fluid supply line 10 for transporting water or medicated fluid from a conventional source (not shown), supporting pipe 20, trigger drinker 30 and trough or mini drinker 40. Pipe 20 is secured to supply line 10 by conventional means, such as clamps (not shown), to prevent the lengths of tube which form supply line 10 from bending, buckling, or leaking at their joints. Pipe 20 is, for example, rigid galvanized steel pipe and may be adjustably suspended by conventional means from the ceiling of the poultry house. By raising or lowering pipe 20, the vertical position of supply line 10 from the floor area can thus be optimized. Since pipe 20 does not transport fluid directly, the choice of materials for its construction can be made to maximize strength and rigidity. On the other hand, supply line 10 can be constructed of more sanitary, durable, and corrosion resistant materials.

Trigger drinker 30 is of conventional construction and mounting into supply line 10, as shown in U.S. Pat. No. 4,491,088. Briefly, saddle 32 is ultrasonically welded to supply line 10 and forms a fluid conduit to the interior of the supply line. Valve housing 34 is detachably snap-fit into sealing engagement with saddle 32 by a mating hook arrangement. A ball/pin valve assembly, preferably with multi-seat sealing, is provided within housing 34 to control fluid flow from supply line 10 out of the valve along trigger pin 36. Such trigger drinkers are extremely responsive to pecking actuation by poultry. Even slight contact with trigger pin 36 causes the valve to permit fluid passage. Thus, birds receive precisely the amount of fluid desired, according to the amount of pecking. It has been found that, given a choice between an open trough water supply and a trigger drinker, most poultry prefer to obtain fluid from the trigger drinker, even if it means crowding about that drinker in competition with other birds.

However, as discussed above, there are circumstances where a trough drinker is still desirable, at least until the birds are old enough to effectively use trigger drinkers. For that purpose, among others, the present invention provides trough drinker 40 which is detachably snap-fit onto supply line 10 at a location spaced apart or offset from trigger drinker 30 along longitudinal axis 15 of supply line 10.

Trough drinker 40 includes support stem 42 which extends generally vertically downward from supply line 10. Housing 44 is disposed about support stem 42 and includes shaft 46 through which stem 42 passes. Trough portion 48 is formed as a lower, outward extension of housing 44 and extends circumferentially about the housing to retain fluid W therein. Flange 50 is formed as upper, outward extension of housing 44. Where, in preferred embodiments, housing 44 is freely rotatable about stem 42, flange 50 is disposed circumferentially about housing 44. Flange 50 extends outwardly along longitudinal axis 15 at least as far as trigger pin 36. Base skirt 60 is attached to stem 42 below trough portion 48. Spring device 70, illustrated, for example, as a coil spring, is mounted about stem 42 between base skirt 60 and spring land 72 of housing 44.

For ease of manufacture, housing 44 is, for example, formed with two separable components 44a and 44b, corresponding respectively to the upper and lower portions of housing 44. These components are slidingly friction-fit together at final assembly, but are readily disassembleable for cleaning, repair, storage, or shipping. Upper component 44a includes flange 50 and shield boss 52 which extends upwardly over stem 42 from the juncture of flange 50 and the housing. Flange 50 includes at least one port 54 at the base of the flange near that juncture.

Figure 4:
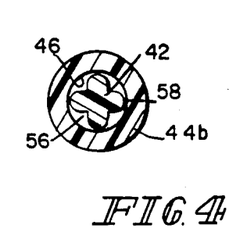
FIG. 4 shows a cross-sectional view along line A—A of FIG. 1.

As shown in FIG. 4, stem 42 has a non-circular cross-sectional configuration. Shaft 46, on the other hand, is, for example, formed with a circular cross-sectional configuration. Thus, with respect to shaft 46, stem 42 includes a plurality of grooves 56. Sliding and rotational contact between stem 42 and shaft 46 is therefore made only at a limited number of contact points 58. In embodiments where it is especially desirable to further reduce component wear and stem/shaft contact, radial recesses 59 are formed in shaft 46.

In embodiments where it is especially desirable to further disassemble the trough drinker, base skirt 60 includes keyed slot 62 configured to receive free end 64 of stem 42. Free end 64 includes, for example, opposing projections 66 therefrom which fit through and below slot 62 to rotatably friction-lock skirt 60 to stem 42.

Figure 3:
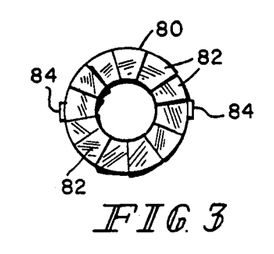
FIG. 3 shows a plan view of the bottom stepped-ratchet surface of the cap portion of the spring tensioning device of a preferred embodiment of the present invention, as shown in FIGS. 1 and 2.

Tensioning arrangement 74 is provided for adjustably tensioning spring 70 against spring land 72. Arrangement 74 includes base portion 76 which is, for example, integrally formed with skirt 60 about slot 62. Base portion 76 includes sequential series of stepped ratchet surfaces 78 on its upper face. Cap portion 80 is rotatably mounted over the upper face of base portion 76 and includes complementary series of stepped ratchet surfaces 82 on its lower face. Cap portion 80 also includes keying radial projections 84 from its outer circumference. Handle 86 is provided to manipulate the tensioning arrangement. Handle 86 includes ring 88 having slots 89 on its interior circumference. Slots 89 correspond to and retain projections 84. Thus, as handle 86 rotates over the surface of skirt 60 ratchet surfaces 78 and 82 slidingly engage in steps such that the upper surface of cap portion 80 is progressively raised, and then dropped as highest ratchet projection is passed over. Spring 70 is supported at its lower end against the upper surface of cap portion 80. As rotation of handle 86 causes cap portion 80 to rise, tension on spring 70 is increased. Alternatively to complementary stepped ratchets, arrangement 74 could include series of progressively stepped "V" surfaces, thus permitting rotation of handle 86 in either direction.

Figure 5:
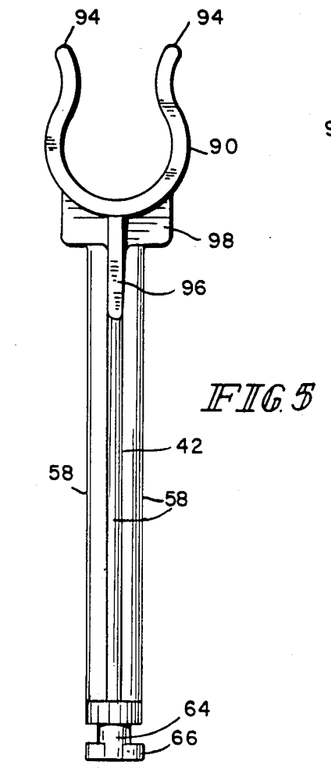
FIG. 5 shows a side plan view of the stem portion of the device illustrated in FIGS. 1 and 2.
Figure 6:
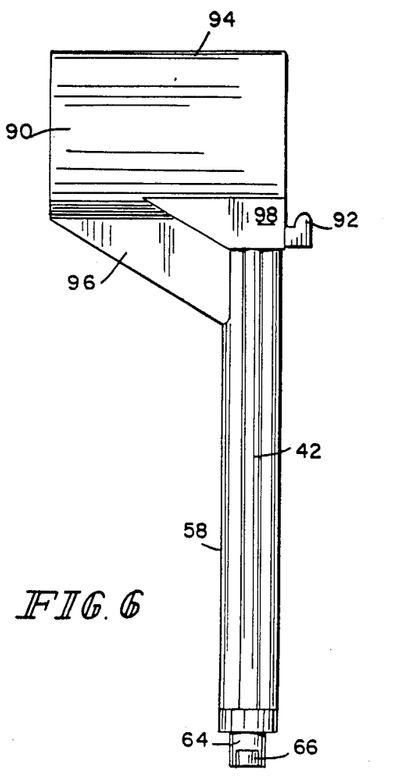
FIG. 6 shows a back plan view of the stem portion of the device illustrated in FIGS. 1 and 2.

Stem 42 is, for example, integrally formed with a resilient snap-fit clamp 90 having a generally U-shaped cross-sectional configuration, as shown in FIG. 5. Clamp 90 is sufficiently rigid to restrict rotational and longitudinal sliding of trough drinker 40 about supply line 10 once secured in place. For environments wherein a particularly large amount of jostling and bumping of the trough drinker by the poultry or small animals is expected, additional devices are provided to rigidly locate the trough. Saddle 32 is formed with surface recess 38. Projection 92 is provided to extend from clamp 90 to complementarily engage surface recess 38 and thereby prohibit unintentional longitudinal sliding of trough drinker 40 along axis 15. Upper flared lips 94 are provided on clamp 90 to engage a lower portion of pipe 20 and thereby prohibit unintentional rotation of trough drinker 40 about supply line 10.

Where clamp 90 is not centered above stem 42 and extends further to one side, as shown in FIG. 1, it has been found to be especially advantageous to provide reinforcement to stem 42. For example, triangular bridging strut 96 is provided between one side of stem 42 and the lower portion of clamp 90. Likewise, reinforcing boss 98 is formed at the base of the stem/clamp juncture.

From the above-detailed description of the preferred embodiments, operation of the trough drinker will now be readily understood. Briefly, trigger drinker 30 is attached to supply line 10 separately from trough drinker 40 and operates independently when trough drinker 40 is not present. The independent operation of trigger drinker 30 is described in detail in the disclosure of U.S. Pat. No. 4,491,088.

Figure 2:
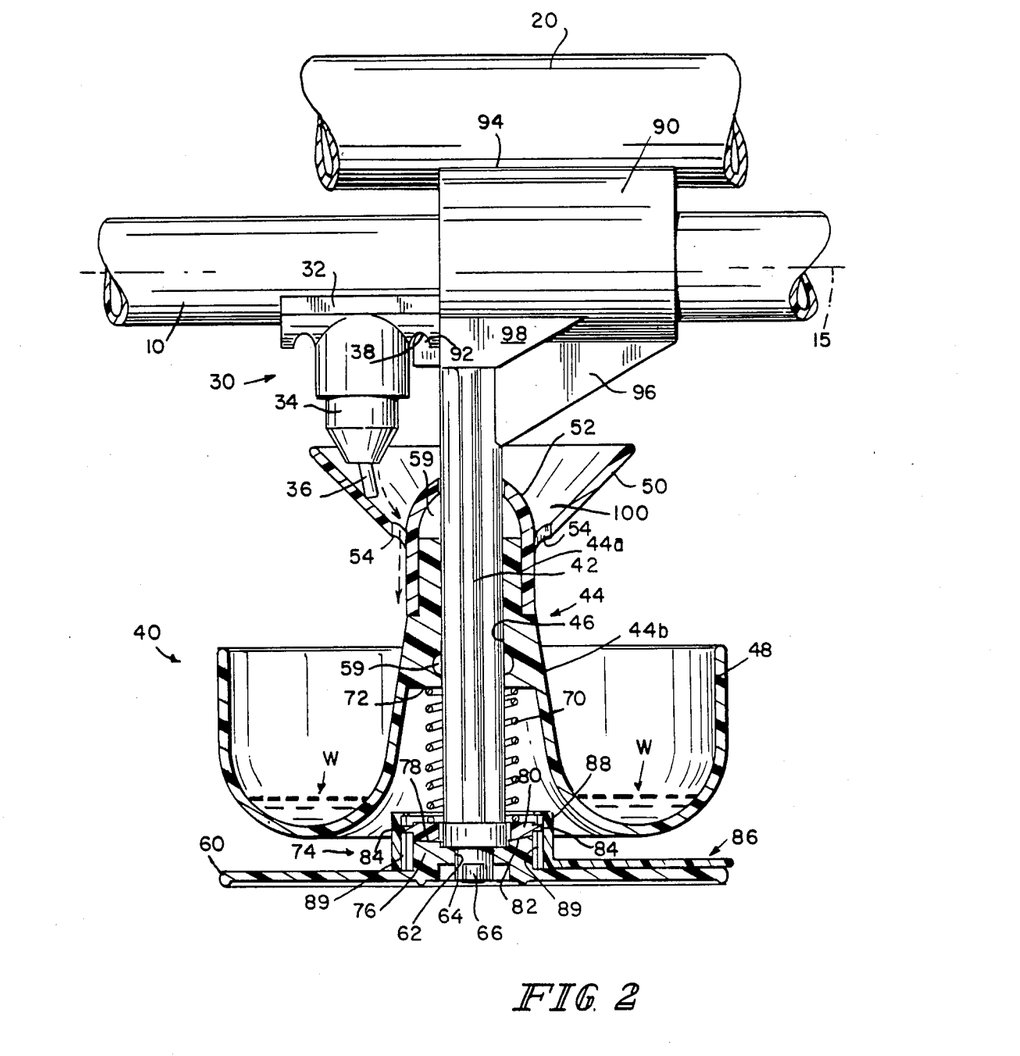
FIG. 2 shows a partial cross-sectional view along the stem axis of the watering arrangements of FIG. 1 in an actuating position with respect to the trigger drinker.

Trough drinker 40 is initially attached to supply line 10 at a position offset from trigger drinker 30. Until a predetermined level of water W is provided to trough portion 48, spring 70 counteracts the weight of housing 44 and the water therein and forces flange 50 upward into actuating engagement with trigger pin 36. Fluid from supply line 10 is thus provided through trigger drinker 30 and along the upper surface of flange 50 into annular distribution area 100 between flange 50 and shield 52. Fluid immediately drains from distribution area 100 through ports 54 to the exterior surface of housing 44. Shield 52 prevents fluid from draining down shaft 46 or to any concealed chambers. From the exterior surface of housing 44, fluid runs directly into trough portion 48. When the predetermined level of fluid is obtained in trough portion 48, the upward force of spring 70 is overcome and flange 50 moves away from trigger pin 36, thereby shutting off the flow of fluid to the trough portion. As the poultry consumes the fluid from the trough portion, the water level decreases and spring 70 again causes flange 50 to actuate trigger drinker 30 to refill trough portion 48.

Rotation of handle 86 changes the force exerted by spring 70 and thereby selectively establishes the predetermined fluid level of trigger drinker actuation. For example, with more tension on spring 70, chicks will be able to drink from a relatively full trough. As tension on spring 70 decreases, the water level in trough portion 48 is also decreased. Thus, an optimum water level can be established according to bird maturity.

The present invention thus provides an efficient and sanitary means of watering even chicks that would otherwise not be strong enough to use trigger drinkers. As those chicks mature, the trough drinker can be removed and the birds will readily take fluid at the trigger drinker, especially since it is at the same watering location they are used to.

Clogging and bacterial contamination are avoided since the present invention does not employ an integral internal valve. The entire valve arrangement is contained within the trigger drinker. If the valve needs to be repaired or replaced, it can be detached without removing the trough drinker. To the extent that some fluid of debris does inadvertently enter shaft 46, grooves 56 on stem 42 facilitate ready passage through the housing.

Since only the internal fluid sealing of trigger drinker 30 is employed, trough drinker 40 does not compound leakage concerns. This drinker is attached only to the exterior of the supply line and is positively located with respect to the trigger drinker by projection 92. The trough drinker is also rigidly clamped against jostling which could otherwise cause spillage. To relieve stress on the trough drinker caused by the press of birds on only one side, it has been found to be particularly advantageous to form housing 44 to be freely rotatable about stem 42 with close spacing between shaft 46 and contact points 58 to prevent "wobble" which might otherwise lead to spillage. Wobbling has also been found to be reduced through the use of relatively elongated housing 44 engaging stem 42 for a considerable length along shaft 46.

Because of its longitudinal and radial stability, the present invention provides a further improvement over the prior art in not requiring added weights to maintain suspension stability. At the same time, raising and lowering of the overall watering system and overhead support construction is thus simplified. The present invention further simplifies attachment and detachment of watering system components; time consuming and leakage prone threading is no longer necessary. It is now relatively simple to preassemble the entire watering system and snap on or off as many trough drinkers as may be needed. For example, in some applications not every trigger drinker need be accompanied by a trough drinker.

The present invention is easy to clean. All fluid flow is on the housing exterior and, if the components are formed from non-corrosive, injection molded plastics, can be readily wiped clean. If a particular trough drinker must be removed for cleaning or repair, it is not necessary to shut off fluid flow in the entire line, the trigger drinker continues to seal against leaks. The present invention further takes advantage of the trigger drinker to minimize the exposed volume of water and preserve fluid freshness.

Also, by selective variations in spring tension, it is possible to alter the water level as the birds mature, rather than or in addition to raising or lowering the vertical height of the entire watering system. Further, the spring tension adjustment mechanism is readily accessible and easy to operate without drinker disassembly.

It is also important to note that the present invention can be utilized alternatively as a platform drinker, wherein skirt 60 rests on the poultry house floor, or as a suspension drinker vertically spaced above the floor without any adjustment. Thus, where the floor is uneven or littered to various heights, a watering system employing the present invention can operate without leakage with some drinkers actually suspended while others are in contact with the floor. Skirt 60 is preferably as wide as trough portion 48 and prevents housing 44 from being moved to actuate the trigger drinker by contact with the floor or litter or the birds themselves.

The demand responsive trough drinker of the present invention also employs flange 50 to some extent to prevent perching on the outer lip of trough portion 48 since flange 50 overhangs substantially toward that outer lip.

In general, the present invention is compatible with most preexisting trigger drinker systems and, thus, does not require a complete overhaul of the entire watering system. Also, this arrangement is relatively inexpensive to manufacture and maintain.

Figure 8:
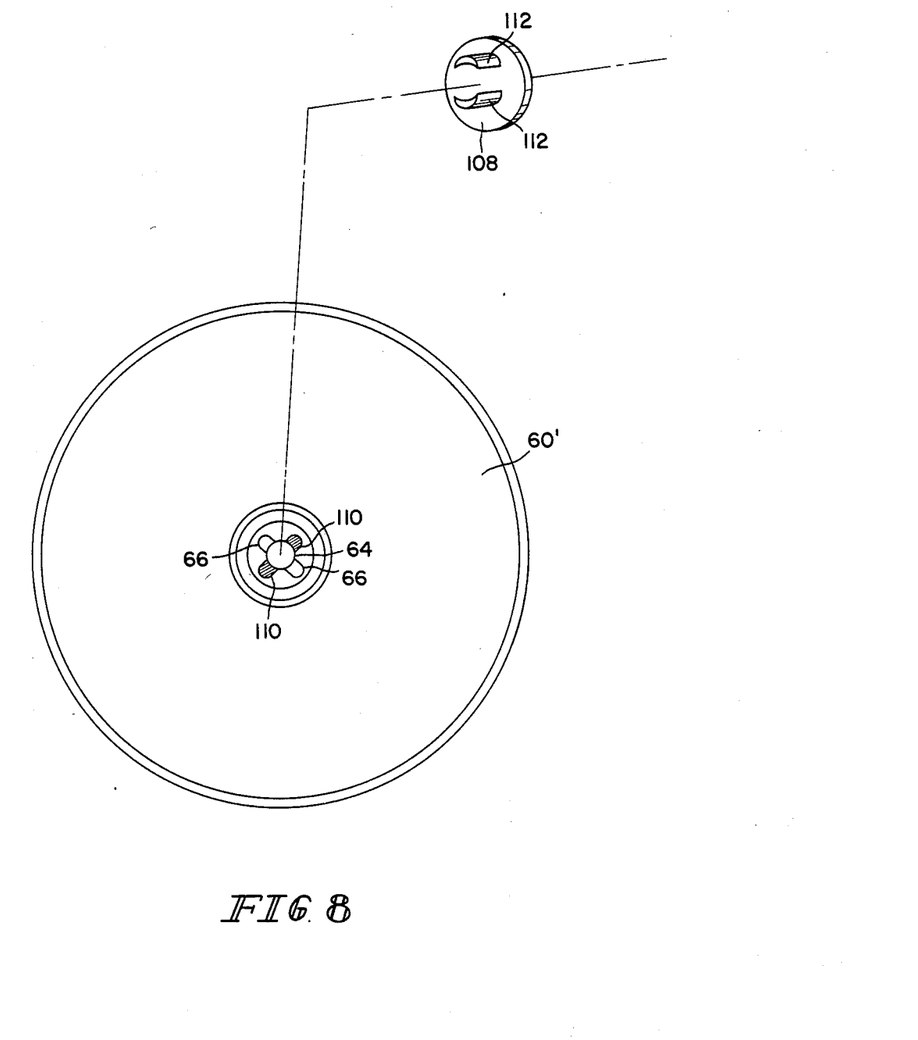
FIG. 8 shows a bottom plan view of the embodiment in FIG. 7 with the locking cap removed therefrom.

FIGS. 7 and 8 show an alternative embodiment of the present invention. Many of the features shown in FIG. 1 are also present in this alternative embodiment and are correspondingly numbered. The principle distinctions are that no adjustable tensioning arrangement is employed with spring 70', flange 50' is adapted for use with nipple drinkers and a locking cap is provided with base skirt 60'.

Specifically, spring 70' extends from spring land 72 to base portion 76'. Unlike the corresponding element in FIG. 1, base portion 76' can be formed with a flat upper surface. Appropriate spring tension is established by selection of the spring to function similarly to the embodiment of FIG. 1. In this simplified arrangement, spring 70' counteracts the force of gravity on drinker 40 to force flange 50' upward into actuating engagement with nipple drinker 30' when the water supply in trough 48 falls below a predetermined level. When trough 48 is thereby refilled, spring 70' is compressed and flange 50' moves out of actuating engagement with nipple drinker 30'.

A particular advantage of the embodiment of FIG. 7 is its adaptability for use with nipple drinkers as well as trigger drinkers. As shown, flange 50' is formed with circumferential ridge 101 on its inner surface 100'. Ridge 101 includes flat portion 102 aligned beneath the actuating pin 104 of nipple drinker 30'. Thus, vertical movement of drinker 40 causes vertical movement of pin 104. In nipple drinkers, primarily actuatable by vertical pin movement, this vertical movement of pin 104 is sufficient to cause fluid flow through the nipple drinker. The same result is provided with trigger drinkers, actuatable by vertical and/or horizontal pin movement.

Another feature of the embodiment of FIG. 7 is the use of a vertical end wall 106 on flange 50'. End wall 106 reduces the outward extension of flange 50' while shielding the nipple or trigger drinker from inadvertent actuation. Reducing the outward extension of flange 50' enlarges the trough opening and increases accessibility to the water therein.

Finally, a locking cap 108 is provided to prevent unlocking rotation of base skirt 60'. Keyed opening 62 includes, for example, wing portions 110 which are otherwise exposed from below when skirt 60 is rotated into friction lock with stem 42, as shown in FIG. 8. Cap 108 includes cap projections 112 which are dimensioned to correspond with the openings of wing portions 110 and friction-fit therein. When cap projections 112 are inserted within wing portions 110, base skirt 60 cannot be rotated with respect to stem 42 to an unlocking position since cap projections 112 block stem projections 66.

Although the present invention has been described in detail, the same is by way of illustration and example and is not to be taken by way of limitation. The spirit and scope of the present invention are to be limited only by the terms of the appended claims.

What is claimed is:

1. An attachment to a poultry or small animal watering system for use with either a trigger drinker or a nipple drinker having a vertically movable actuating pin, comprising:

a housing portion;

enegagement means, connected to said housing portion, for detachably securing said attachment to a supply line separately from said trigger drinker or nipple drinker;

a water retaining portion connected to said housing portion;

a flange portion connected to said housing portion;

biasing means, connected to said housing portion, for causing vertical movement of said flange portion in response to a predetermined volume of fluid being present in said water retaining portion; and said vertical movement of said flange portion causing actuating engagement of said flange portion with said actuating pin which results in fluid flow from said trigger drinker of said nipple drinker over the exterior surface of said housing portion.

2. The attachment according to claim 1 wherein said flange portion includes a circumferential flat portion aligned with the lowermost part of said actuating pin for actuating engagement therewith.

* * * * *